United States Patent
Okuno et al.

(10) Patent No.: US 11,698,764 B2
(45) Date of Patent: Jul. 11, 2023

(54) IMAGE RECORDING DEVICE, COMPUTER READABLE MEDIUM, AND METHOD TO BACK UP SETTING INFORMATION

(71) Applicant: BROTHER KOGYO KABUSHIKI KAISHA, Nagoya (JP)

(72) Inventors: Tetsuya Okuno, Nagoya (JP); Shinya Esaki, Nagoya (JP); Shunsuke Minamikawa, Nagoya (JP); Haruka Azechi, Nagoya (JP); Yushi Deura, Nagoya (JP); Tony Lee, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/486,983

(22) Filed: Sep. 28, 2021

(65) Prior Publication Data

US 2022/0011991 A1   Jan. 13, 2022

Related U.S. Application Data

(63) Continuation of application No. PCT/JP2020/013603, filed on Mar. 26, 2020.

(30) Foreign Application Priority Data

Mar. 28, 2019   (JP) .................................. 2019-063838

(51) Int. Cl.
*G06F 3/12*   (2006.01)
(52) U.S. Cl.
CPC .......... *G06F 3/1231* (2013.01); *G06F 3/1204* (2013.01)
(58) Field of Classification Search
CPC ............................. G06F 3/1231; G06F 3/1204
(Continued)

(56) References Cited

U.S. PATENT DOCUMENTS 6,311,232 B1   10/2001   Cagle et al.
6,672,695 B1 *   1/2004   Naka .................... B41J 2/17546
    347/7

(Continued)

FOREIGN PATENT DOCUMENTS

CN        1257007 A    6/2000
CN      102201083 A    9/2011
(Continued)

OTHER PUBLICATIONS

International Search Report dated May 19, 2020 issued in PCT/JP2020/013603.

(Continued)

*Primary Examiner* — Moustapha Diaby
(74) *Attorney, Agent, or Firm* — Scully, Scott, Murphy & Presser, PC

(57) ABSTRACT

An image recording device includes a cartridge mount to which a cartridge is mounted, a print engine that performs printing, a cartridge interface, an information interface, a memory, and a controller. The controller stores setting information obtained through the information interface in the memory, transmits identification information, the setting information and a backup instruction to an information processing device, the identification information being associated with the cartridge mounted in the cartridge mount, the backup instruction being for instructing to store the identification information and the setting information in association with each other, obtains the identification information from a cartridge memory, transmits the obtained identification information and a return instruction to the information processing device, the return instruction being for instructing to return the setting information, obtains the setting information transmitted by the information processing (Continued)

device, and stores the setting information obtained from the information processing device in the memory.

9 Claims, 9 Drawing Sheets

(58) Field of Classification Search
USPC .............................. 358/1.13, 1.14, 1.15, 1.1
See application file for complete search history.

(56) References Cited

U.S. PATENT DOCUMENTS

| | | | | |
|---|---|---|---|---|
| 7,673,079 | B2* | 3/2010 | Hayashi | G06F 3/1232 719/321 |
| 2004/0070774 | A1 | 4/2004 | Ishibashi et al. | |
| 2006/0285859 | A1 | 12/2006 | Cook | |
| 2007/0043791 | A1* | 2/2007 | Tada | G06F 11/1456 714/E11.12 |
| 2008/0244043 | A1* | 10/2008 | Kawai | H04L 41/0853 709/221 |
| 2011/0234656 | A1 | 9/2011 | Mizutani et al. | |
| 2011/0238704 | A1 | 9/2011 | Koike et al. | |
| 2012/0290807 | A1* | 11/2012 | Akirav | G06F 3/0637 711/163 |
| 2016/0112191 | A1* | 4/2016 | Topham | H04L 9/0897 713/189 |
| 2016/0292629 | A1 | 10/2016 | Matsuda | |
| 2018/0349075 | A1 | 12/2018 | Inoue | |

FOREIGN PATENT DOCUMENTS

| | | |
|---|---|---|
| EP | 1976189 A2 | 10/2008 |
| JP | 2001-63027 A | 3/2001 |
| JP | 2002-240400 A | 8/2002 |
| JP | 2006-276523 A | 10/2006 |
| JP | 2011-97337 A | 5/2011 |
| JP | 2018-207240 A | 12/2018 |

OTHER PUBLICATIONS

International Preliminary Report on Patentability together with the Written Opinion dated Sep. 28, 2021 from related PCT/JP2020/013603.

Notification of First Office Action dated Sep. 28, 2022 received from the China National Intellectual Property Administration in related application CN 202080025183.6 together with English language translation.

Extended European Search Report dated Dec. 1, 2022 from related application EP 20778705.2.

* cited by examiner

FIG. 4A

| No. | DEVICE IDENTIFICATION INFORMATION | BACKUP DATA |
|---|---|---|
|  |  |  |

FIG. 4B

| No. | DEVICE IDENTIFICATION INFORMATION | BACKUP DATA |
|---|---|---|
| 1 | A-001 | backup1.bin |

FIG. 4C

| No. | DEVICE IDENTIFICATION INFORMATION | BACKUP DATA |
|---|---|---|
| ~~1~~ | ~~A-001~~ | ~~backup1.bin~~ |

FIG. 4D

| No. | DEVICE IDENTIFICATION INFORMATION | BACKUP DATA |
|---|---|---|
| ~~1~~ | ~~A-001~~ | ~~backup1.bin~~ |
| 2 | A-002 | backup1.bin |

FIG. 4E

| No. | CARTRIDGE IDENTIFICATION INFORMATION | BACKUP DATA |
|---|---|---|
|  |  |  |

FIG. 4F

| No. | CARTRIDGE IDENTIFICATION INFORMATION | BACKUP DATA |
|---|---|---|
| 1 | M11C11Y11Bk11 | backup1.bin |

FIG. 4G

| No. | CARTRIDGE IDENTIFICATION INFORMATION | BACKUP DATA |
|---|---|---|
| 1 | M11C11Y11Bk12 | backup1.bin |

IMAGE RECORDING DEVICE, COMPUTER READABLE MEDIUM, AND METHOD TO BACK UP SETTING INFORMATION

CROSS-REFERENCE TO RELATED APPLICATIONS

This is a Continuation of International Application No. PCT/JP2020/013603 filed on Mar. 26, 2020, which claims priority from Japanese Patent Application No. 2019-063838 filed on Mar. 28, 2019. The entire disclosures of the prior applications are incorporated herein by reference.

BACKGROUND

Technical Field

Aspects of the present disclosure relate to a technique for backing up setting information of an image recording device.

Related Art

There has been known an image forming system including image forming devices and a management server. In this image forming system, the management server stores pieces of setting information which are pieces of information that are respectively set in the image forming devices. When an administrator connects a new image forming device to the image forming system in place of an old image forming device, the new image forming device transmits a registration request to the management server. Upon receiving the registration request, the management server transmits information of a candidate list indicating old image forming devices to the new image forming device. When the information of the candidate list is obtained, the new image forming device displays the information on a panel and makes the administrator select an old image forming device to be replaced from the candidate list.

When the administrator selects the image forming device to be replaced, the management server transmits setting information of the image forming device to be replaced to the new image forming device. When the setting information is obtained, the new image forming device updates setting information thereof to the obtained setting information.

SUMMARY

In the above-mentioned technique, the administrator needs to select an image forming device to be replaced.

According to aspects of the present disclosure, there is provided an image recording device including a cartridge mount to which a cartridge is to be mounted, a printing part that performs printing, a cartridge interface, an information interface, a memory, and a controller. The controller stores setting information obtained through the information interface in the memory, transmits identification information, the setting information and a backup instruction to an information processing device through the information interface, the identification information being associated with the cartridge mounted in the cartridge mount, and the backup instruction being for instructing to store the identification information and the setting information in association with each other, obtains the identification information from a cartridge memory of the cartridge through the cartridge interface, transmits the obtained identification information and a return instruction to the information processing device through the information interface, the return instruction being for instructing to return the setting information, obtains the setting information from the information processing device through the information interface, and stores the setting information obtained from the information processing device in the memory.

According to aspects of the present disclosure, there is further provided a backup method executed by a first image recording device and a second image recording device each including a cartridge mount to which a cartridge is to be mounted, a printing part that performs printing, a cartridge interface, an information interface, a memory, and a controller. The controller of the first image recording device is configured to store setting information obtained through the information interface in the memory and transmits identification information, the setting information and a backup instruction to an information processing device through the information interface, the identification information being associated with the cartridge mounted in the cartridge mount, and the backup instruction being for instructing to store the identification information and the setting information in association with each other. The controller of the second image recording device is configured to obtain, through the cartridge interface, the identification information from a cartridge memory of the cartridge detached from the first image recording device and mounted to the cartridge mount of the second image recording device and transmits, to the information processing device through the information interface, the obtained identification information and a return instruction instructing to return the setting information, and obtain the setting information from the information processing device through the information interface and stores the obtained setting information in the memory.

According to aspects of the present disclosure, there is further provided a non-transitory computer-readable medium storing computer-readable instructions configured to, when executed by a controller of an image recording device including a cartridge mount to which a cartridge is to be mounted, a printing part that performs printing, a cartridge interface, an information interface, and a memory, cause the controller to store setting information obtained through the information interface in the memory, transmit identification information, the setting information and a backup instruction to an information processing device through the information interface, the identification information being associated with the cartridge mounted in the cartridge mount, and the backup instruction being for instructing to store the identification information and the setting information in association with each other, obtain the identification information from a cartridge memory of the cartridge through the cartridge interface, transmit the obtained identification information and a return instruction to the information processing device through the information interface, the return instruction being for instructing to return the setting information, obtain the setting information from the information processing device through the information interface, and store the setting information obtained from the information processing device in the memory.

BRIEF DESCRIPTION OF THE ACCOMPANYING DRAWINGS

FIG. 4A is a diagram illustrating a backup database according to an embodiment.

FIG. 4B is a diagram illustrating the backup database according to the embodiment.

FIG. 4C is a diagram illustrating the backup database according to the embodiment.

FIG. 4D is a diagram illustrating the backup database according to the embodiment.

FIG. 4E is a diagram illustrating a backup database according to a variation.

FIG. 4F is a diagram illustrating the backup database according to the variation.

FIG. 4G is a diagram illustrating the backup database according to the variation.

DETAILED DESCRIPTION

Figure 1:
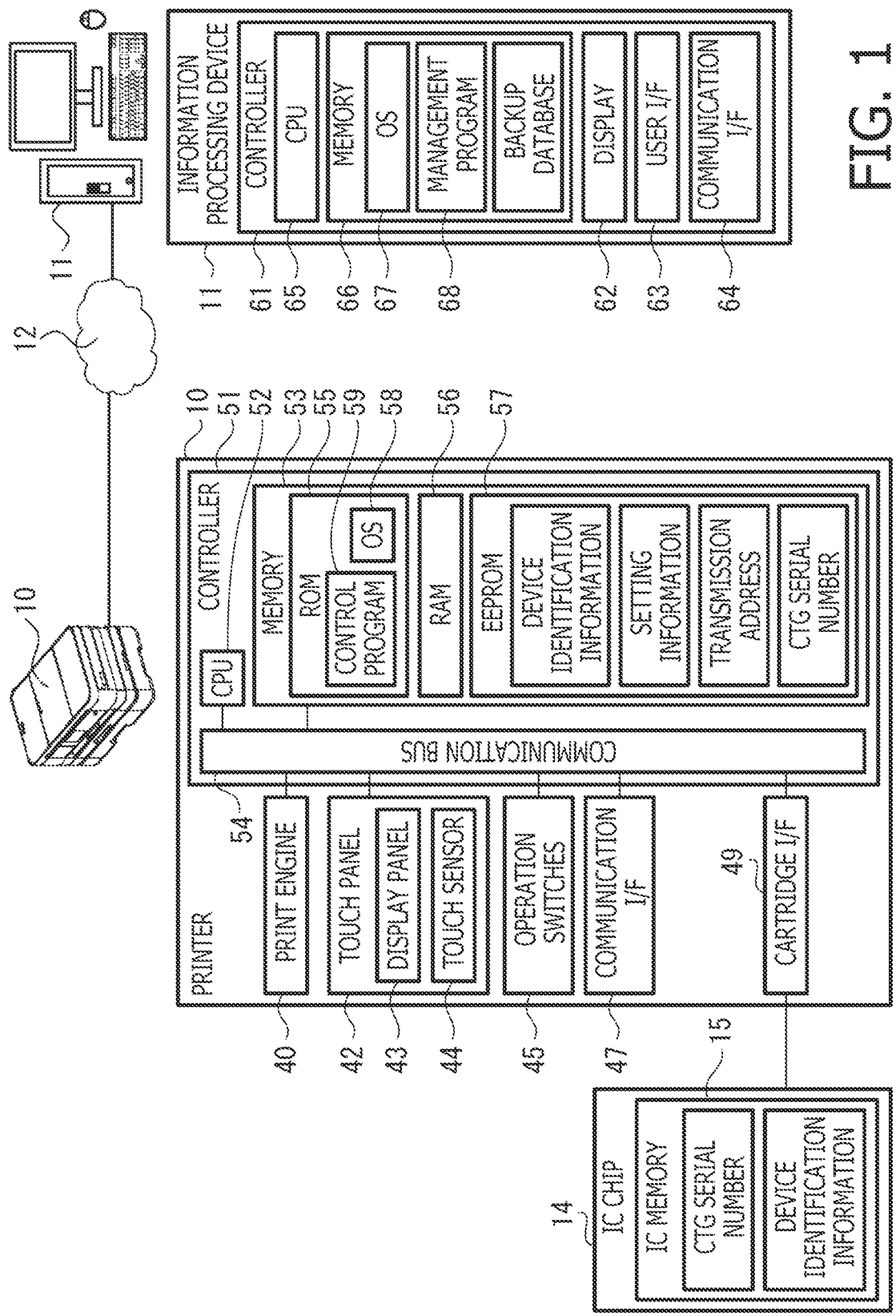
FIG. 1 is a functional block diagram of a printer and an information processing device.

Hereinafter, embodiments of the present disclosure will be described. It is noted that the embodiments described below are merely examples of the present disclosure, and the embodiments of the present disclosure can be modified appropriately without changing the scope of the present disclosure. It is also noted that aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

In the present embodiment, a printer 10 illustrated in FIG. 1 will be described. The printer 10 is used when a user makes a contract with a service provider. The service provider provides a service to the user using an information processing device 11. For example, the service provider monitors remaining amounts of consumables in the printer 10 using the information processing device 11, and delivers the consumables to the user when the remaining amounts of consumables become low.

The service provider provides the user with a service for backing up setting information set in the printer 10 using the information processing device 11. The information processing device 11 stores the setting information transmitted by the printer 10 in a memory 66 to perform backup. When the printer 10 that has been used by the user is replaced with another printer 10, the information processing device 11 specifies the printer 10 before replacement and transmits the setting information stored in the memory 66 to the printer 10 after replacement. The printer 10 after replacement stores the setting information transmitted by the information processing device 11 in the memory 53. That is, the setting information set in the printer 10 before replacement is taken over by the printer 10 after replacement. This will be described in detail below. In the following description, the printer 10 before replacement will be referred to as a printer 10A, the printer 10 after replacement will be referred to as a printer 10B, and the printer 10A before replacement and the printer 10B after replacement will be referred to as the printer 10 when they are not distinguished from each other.

The information processing device 11 is, for example, a server that is identified by a URL on the Internet 12. The information processing device 11 includes a controller 61, a display 62, a user I/F 63, and a communication I/F 64. "I/F" stands for interface. The user I/F 63 is a mouse, a keyboard, or the like.

The controller 61 mainly includes a Central Processing Unit (CPU) 65, a memory 66, and a not-shown communication bus. The CPU 65, the memory 66, the display 62, the user I/F 63, and the communication I/F 64 are connected to the communication bus. That is, the CPU 65 is connected to the memory 66, the display 62, the user I/F 63, and the communication I/F 64 via the communication bus so as to be able to exchange information and data with each other.

The memory 66 is a ROM, a RAM, a hard disk, or the like. The memory 66 stores an Operating System (OS) 67, and a management program 68. Instructions described in the OS 67 and the management program 68 are executed by the CPU 65. That is, the OS 67 and the management program 68 are executed by the CPU 65. The OS 67 and the management program 68 executed by the CPU 65 cause the display 62 to display images, receive user inputs through the user I/F 63, transmit and receive information and data through the communication I/F 64, and store the received information and data in the memory 66. The management program 68 stores setting information and device identification information obtained from the printer 10 in the memory 66. Specifically, the management program 68 manages the setting information and the device identification information stored in the memory 66 in association with each other in the backup database. Details will be described later.

The printer 10 may be a dedicated printer that is used only in a mode in which the user uses the printer by making a contract with the service provider, or may be a general-purpose printer that is used regardless of whether or not the user makes a contract with the service provider. Hereinafter, an example in which the printer 10 is a general-purpose printer will be described. In the following description, a mode in which the user uses the printer 10 while making a contract with the service provider will be referred to as a contract usage mode, and a mode in which the user uses the printer 10 without making a contract with the service provider will be referred to as a normal usage mode.

Figure 2A:
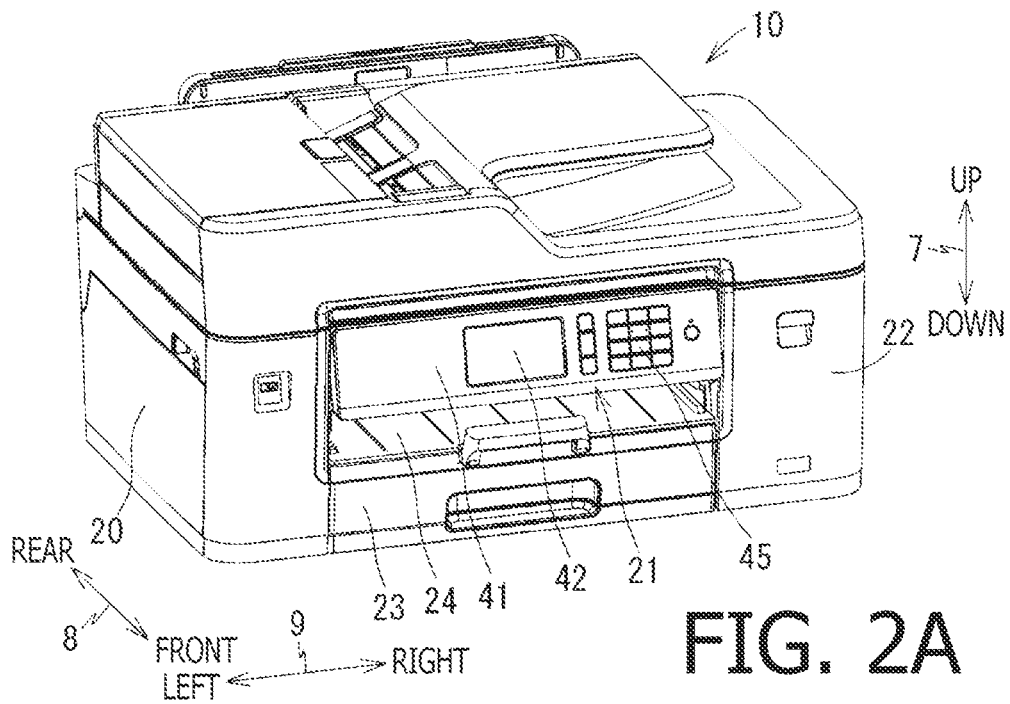
FIG. 2A is a perspective view of the printer with a cover closed.
Figure 2B:
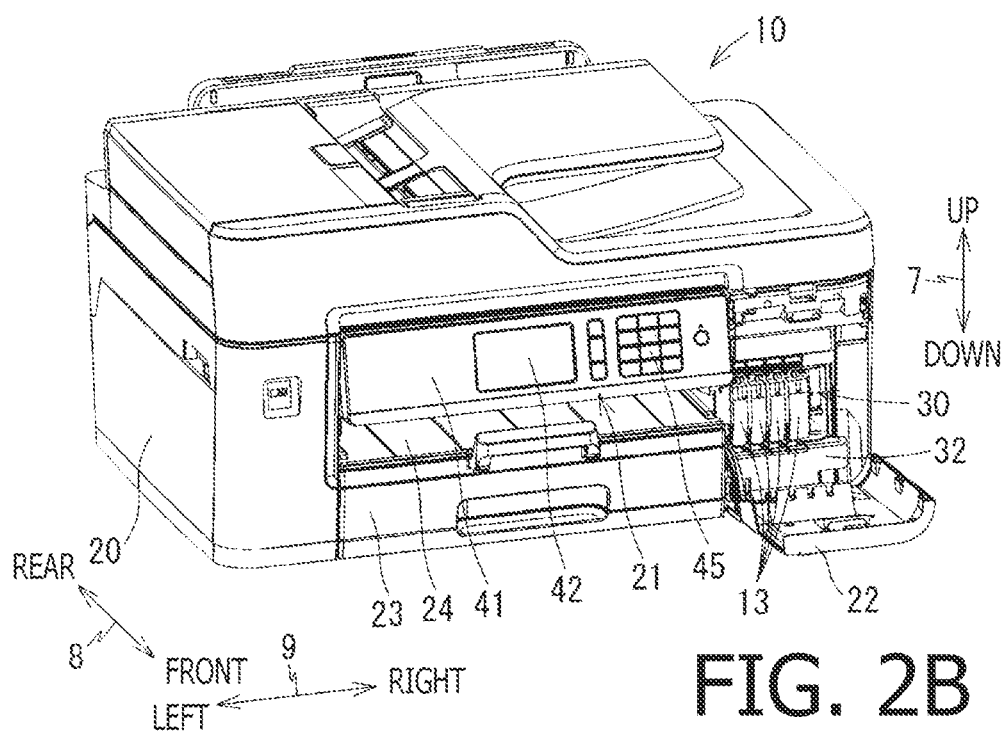
FIG. 2B is a perspective view of the printer with the cover open.
Figure 3:
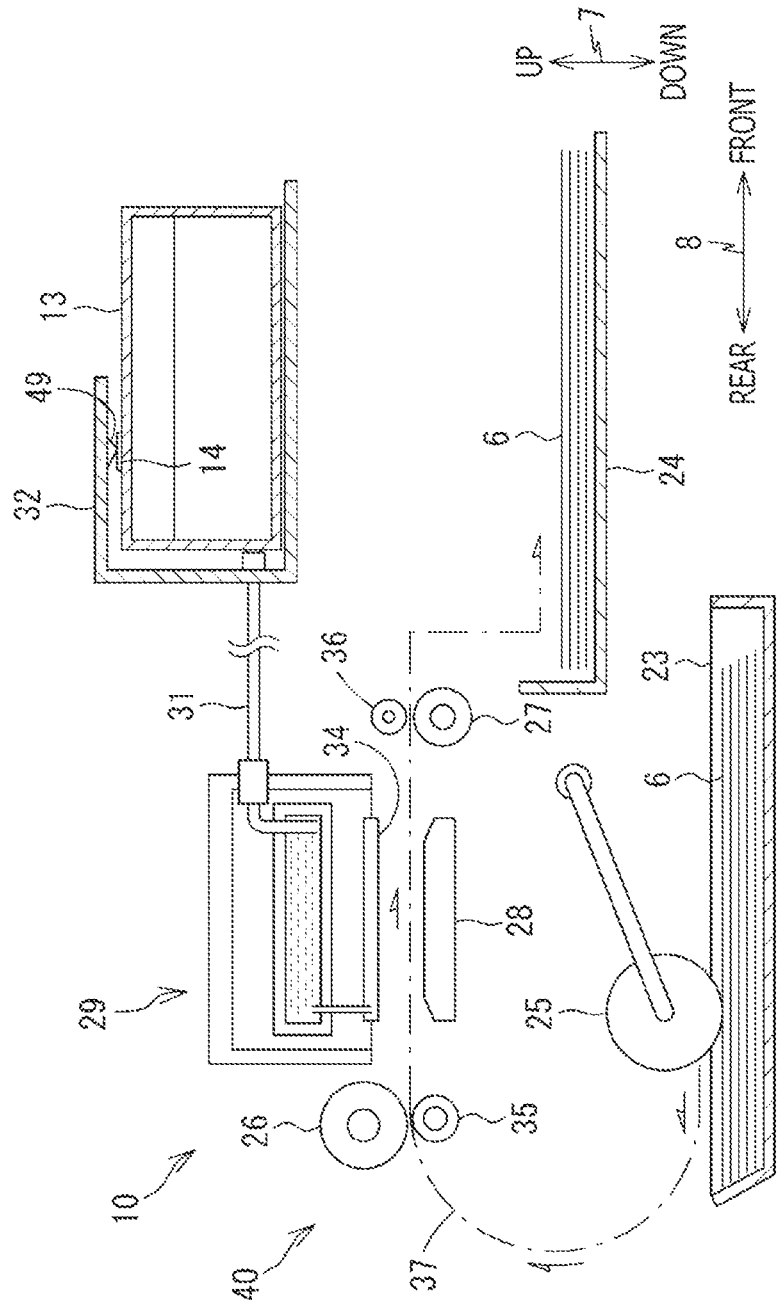
FIG. 3 is a schematic cross-sectional view of the printer.

As shown in FIG. 2, the printer 10 includes a housing 20, and a panel assembly 21, a cover 22, a sheet feed tray 23 and a sheet discharge tray 24 that are held by the housing 20.

The panel assembly 21 includes a panel body 41, and a touch panel 42 and a plurality of operation switches 45 held by the panel body 41. The panel body 41 has a rectangular plate shape and is attached to one surface of the housing 20. In the following description, in a state in which the printer 10 is placed on a horizontal surface, a front-rear direction 8 is defined with one surface of the housing 20 on which the panel body 41 is placed as a front surface, and a direction along a vertical direction is defined as an up-down direction 7. Further, the left and right when the printer 10 is viewed from the front are defined as a left-right direction 9. The front-rear direction 8 and the left-right direction 9 are parallel to the horizontal surface, are orthogonal to the up-down direction 7, and are orthogonal to each other.

As shown in FIG. 1, the touch panel 42 has a display panel 43 that displays an image, and a transparent film-shaped touch sensor 44 that is superimposed on the display panel 43. The touch sensor 44 outputs position information indicating a position on the display panel 43 touched by the user.

The display panel 43 and the touch sensor 44 of the touch panel 42 are connected to a controller 51 (FIG. 1) described later by a cable or the like. The controller 51 outputs image data to the display panel 43 to cause the display panel 43 to display an image. The controller 51 also receives the position information output from the touch sensor 44.

The operation switch 45 has a contact that opens and closes in accordance with a user operation. The operation switch 45 outputs detection signals having different voltage values in the case in which the contact is open and in the case in which the contact is closed. The operation switch 45 is connected to the controller 51 by a cable or the like. The controller 51 receives the detection signal input from the operation switch 45. It is noted that only either of the touch sensor 44 and the operation switches 45 may be provided to the panel assembly 21.

As shown in FIG. 2, the sheet feed tray 23 is located at a lower portion of the housing 20 and is detachably held by the housing 20. The sheet discharge tray 24 is located at a lower portion of the housing 20 and above the sheet feed tray 23, and is held by the sheet feed tray 23 or the housing 20. The cover 22 is positioned at the right portion of the front surface of the housing 20 and is rotatably held by the housing 20. The cover 22 rotates between a closed position at which the cover 22 closes an opening 30 provided at the right portion of the housing 20 and an open position at which the cover 22 opens the opening 30. A mounting case 32 is disposed behind the opening 30 and held by the housing 20. The mounting case 32 has a configuration of detachably holding the cartridges 13. Since this configuration is well known, detailed description thereof will be omitted.

The mounting case 32 detachably holds the plurality of cartridges 13. In the illustrated example, the mounting case 32 detachably holds four cartridges 13. Each of the four cartridges 13 stores ink of corresponding color such as magenta, cyan, yellow, and black. That is, the printer 10 is an inkjet printer and is a color printer. However, the mounting case 32 may detachably hold only one cartridge 13 storing ink of black color. That is, the printer 10 may be a monochrome printer. The mounting case 32 may detachably hold one or a plurality of cartridges 13 containing toner instead of ink. That is, the printer 10 may be a laser printer.

The mounting case 32 has a cartridge I/F 49 shown in FIG. 1. The cartridge I/F 49 is, for example, terminals. The cartridge I/F 49 is provided at a position where it contacts not-shown electrodes of IC chips 14 which the cartridges 13 mounted in the mounting case 32 have. The cartridge I/F 49 is connected to the controller 51 described later by a not-shown cable.

It is noted that the cartridge I/F 49 may be an antenna. For example, as the cartridge I/F 49, a substrate having a pattern antenna is provided in the mounting case 32. Similarly, the IC chip 14 is provided with an antenna. The cartridge I/F 49 outputs radio waves to be received by the antenna of the IC chip 14 and the antenna of the IC chip 14 receives the output radio waves. That is, the cartridge I/F 49 receives information or data from the IC chip 14 and transmits information or data to the IC chip 14 by way of radio waves.

The cartridge I/F 49 may also be a light emitting diode and a photodiode. For example, as the cartridge I/F 49, a substrate having a light emitting diode and a photodiode is provided to the mounting case 32. Similarly, the IC chip 14 is provided with a light emitting diode and a photodiode. The cartridge I/F 49 emits light to be received by the photodiode of the IC chip 14 and receives light emitted by the light-emitting diode of the IC chip 14. That is, the cartridge I/F 49 may receive information or data from the IC chip 14 and transmit information or data to the IC chip 14 by way of light.

The cartridge 13 has a box shape having an internal space for storing ink. Since the basic configuration of the cartridge 13 is well known, detailed description thereof will be omitted. The cartridge 13 includes the IC chip 14. In the illustrated example, the IC chip 14 is attached to an upper surface of the cartridge 13. The IC chip 14 has a not-shown electrode that contacts the cartridge I/F 49, which is a terminal, and an IC memory 15 electrically connected to the electrode. Alternatively, the IC chip 14 has an antenna such as a pattern antenna, or a light emitting diode and a photodiode in place of the electrode. The IC memory 15 stores various information. Specifically, the IC memory 15 stores a model number, type information, and a CTG serial number.

The model number is identification information assigned to the cartridge 13 in accordance with the color of ink stored in the cartridge 13 and the type of ink such as dye or pigment. The type information is information indicating whether the cartridge 13 is a cartridge to be used in the contract usage mode or a cartridge to be used in the normal usage mode. For example, the type information is 1-bit data that is stored at a predetermined address of the IC memory 15 and that indicates "0" or "1." For example, "1" indicates that the cartridge is to be used in the contract usage mode, and "0" indicates that the cartridge is to be used in the normal usage mode. However, the type information may be included in the model number. That is, certain model number may indicate the color and type of certain ink and whether the ink is to be used in the normal usage mode or the contract usage mode. It is noted that, in a case where the printer 10 has a dedicated specification in which the printer 10 is used only in a mode in which the user makes a contract with the service provider to use the printer 10, the type information is not stored in the IC memory 15. The CTG serial number is a number for identifying each cartridge 13.

The housing 20 holds the print engine 40 therein. The print engine 40 mainly includes a sheet feed roller 25, a conveying roller 26, a discharge roller 27, a platen 28, and a recorder 29. The sheet feed roller 25 is held by a not-shown frame provided in the housing 20 so as to be able to contact a sheet 6 placed on the sheet feed tray 23. The sheet feed roller 25 is rotated by a not-shown motor. The rotating sheet feed roller 25 feeds the sheet 6 to a conveyance path 37. The conveyance path 37 is a space defined by a not-shown guide member. In the illustrated example, the conveyance path 37 extends in a curved manner from a rear end of the sheet feed tray 23 to a position above the sheet feed tray 23, and then extends forward.

The conveying roller 26 is located downstream of the sheet feed tray 23 in a conveying direction of the sheet 6. The conveying roller 26 and a driven roller 35 constitute a roller pair. The conveying roller 26 is rotated by a not-shown motor. The rotating conveying roller 26 and driven roller 35 convey the sheet 6 fed to the conveyance path 37 by the sheet feed roller 25 while nipping the sheet 6. The discharge roller 27 is located downstream of the conveying roller 26 in the conveying direction of the sheet 6. The discharge roller 27 and a driven roller 36 constitute a roller pair. The discharge roller 27 is rotated by a not-shown motor. The rotating discharge roller 27 and driven roller 36 convey the sheet 6 while nipping the sheet 6, and discharge the sheet 6 on the sheet discharge tray 24. The platen 28 is located between the conveying roller 26 and the discharge roller 27 in the front-rear direction 8, and downstream of the conveying roller 26 and upstream of the discharge roller 27 in the conveying direction of the sheet 6.

The recorder 29 is located above the platen 28. The recorder 29 may be held by a guide rail that is a part of the frame so as to be movable in the left-right direction 9, or may be fixed to the frame. That is, the printer may be a serial printer or a line printer. The recorder 29 has a head 34. The head 34 has a flow path therein through which ink flows. The flow path communicates with the internal space of the cartridge 13 mounted in the mounting case 32 via a tube 31. That is, the ink stored in the cartridge 13 is supplied to the head 34 through the tube 31.

The printer 10 further includes the controller 51 and a communication I/F 47 which are shown in FIG. 1. The communication I/F 47 is, for instance, connected to a local network such as a wired Local Area Network (LAN) or a wireless LAN. The local network is connected to the Internet 12 via a not-shown router. Alternatively, the communication I/F 47 may be connected to a terminal device such as a personal computer or a tablet via a communication cable such as a USB cable. The terminal device is connected to the Internet 12 via a communication cable, a local network, and a router. That is, the printer 10 is connected to the Internet 12.

The controller 51 has a CPU 52, a memory 53, and a communication bus 54. The CPU 52, the memory 53, the touch panel 42, the operation switches 45, the communication I/F 47, and the cartridge I/F 49 are connected to the communication bus 54. That is, the CPU 52 is connected to the memory 53, the touch panel 42, the operation switches 45, the communication I/F 47 and the cartridge I/F 49 via the communication bus 54 so as to be able to exchange information and data with each other.

The memory 53 has a ROM 55, a RAM 56, and an EEPROM 57. The ROM 55 stores an OS 58 being an operating system and a control program 59 in advance. Instructions described in the OS 58 and the control program 59 are executed by the CPU 52. That is, the OS 58 and the control program 59 are executed by the CPU 52. The OS 58 and the control program 59 executed by the CPU 52 cause the display panel 43 to display an image and receive an input from the user through at least one from a group of the touch sensor 44 and the operation switches 45. The OS 58 and the control program 59 executed by the CPU 52 transmit and receive information and data through the communication I/F 47 and the cartridge I/F 49, and store the received information and data in the memory 53.

The control program 59 may be a single program or a program including a plurality of modules. The control program 59 has, for example, a UI module, a communication module, and a print control module. Every module is executed in quasi parallel manner by a multitasking.

The UI module is a program that inputs image data to the display panel 43, causes the display panel 43 to display an image including objects such as icons, and receives a signal output from at least one from the group of the touch sensor 44 and the operation switches 45.

The communication module is a program for transmitting and receiving information and data in accordance with a communication protocol of a communication line to which the communication I/F 47 is connected. For example, in a case where the communication I/F 47 is connected to the USB cable, the communication module transmits and receives information and date using a communication protocol. In a case where the communication I/F 47 is connected to a LAN cable, or in a case where the communication I/F 47 is connected via a wireless local area network (LAN), the communication module transmits and receives information and data using a communication protocol such as TCP/IP.

The print control module is a program that generates and outputs drive signals to be input to drive circuits of the above-mentioned motors and drive circuits of not-shown drive elements which the head 34 has based on print data.

The RAM 56 is used to execute the OS 58 and the control program 59, and temporarily stores information and data in the execution of the OS 58 and control program 59. The EEPROM 57 stores device identification information, setting information, a transmission address, and the CTG serial numbers. The device identification information may be a serial number or a MAC address stored in advance in the EEPROM 57, or may be a private ID set by the service provider. For example, the private ID may be input to the printer 10 by the service provider through at least one from the group of the touch sensor 44 and the operation switches 45, or may be input to the printer 10 from a terminal device such as a tablet or a portable terminal through the communication I/F 47. Alternatively, the private ID may be input from the information processing device 11 to the printer 10 through the Internet 12 and the communication I/F 47.

The setting information is, for example, a print setting, a scan setting, a fax number or an e-mail address input to the printer 10 by the user using at least one from the group of the touch sensor 44 and the operation switches 45, and the like. Types of the setting information are not particularly limited. The control program 59 stores the setting information input through at least one from the group of the touch sensor 44, the operation switches 45, and the communication I/F 47 in the EEPROM 57. The transmission address is a URL or an IP address of the information processing device 11. For example, the transmission address may be input to the printer 10 by the service provider through at least one from the group of the touch sensor 44 and the operation switches 45, or may be input to the printer 10 from a terminal device such as a tablet or a portable terminal through the communication I/F 47. The CTG serial numbers are numbers stored in the IC memories 15 of the cartridges 13 mounted in the mounting case 32. The controller 51 reads the CTG serial numbers from the IC memories 15 through the cartridge I/F 49 and stores the read CTG serial numbers in the EEPROM 57. The CTG serial numbers stored in the EEPROM 57 are used to determine whether the cartridges 13 mounted in the mounting case 32 have been replaced with other cartridges 13. Details will be described later.

Hereinafter, processes executed by the control program 59 of the printer 10 and the management program 68 of the information processing device 11 will be described. These processes are executed so that the setting information set in the printer 10A before the replacement is taken over by the printer 10B after the replacement. In the following description, processes executed by the control program 59 of the printer 10 are described as processes executed by the controller 51 (particularly, the CPU 52), and processes executed by the management program 68 of the information processing device 11 is described as processes executed by the controller 61.

Figure 5:
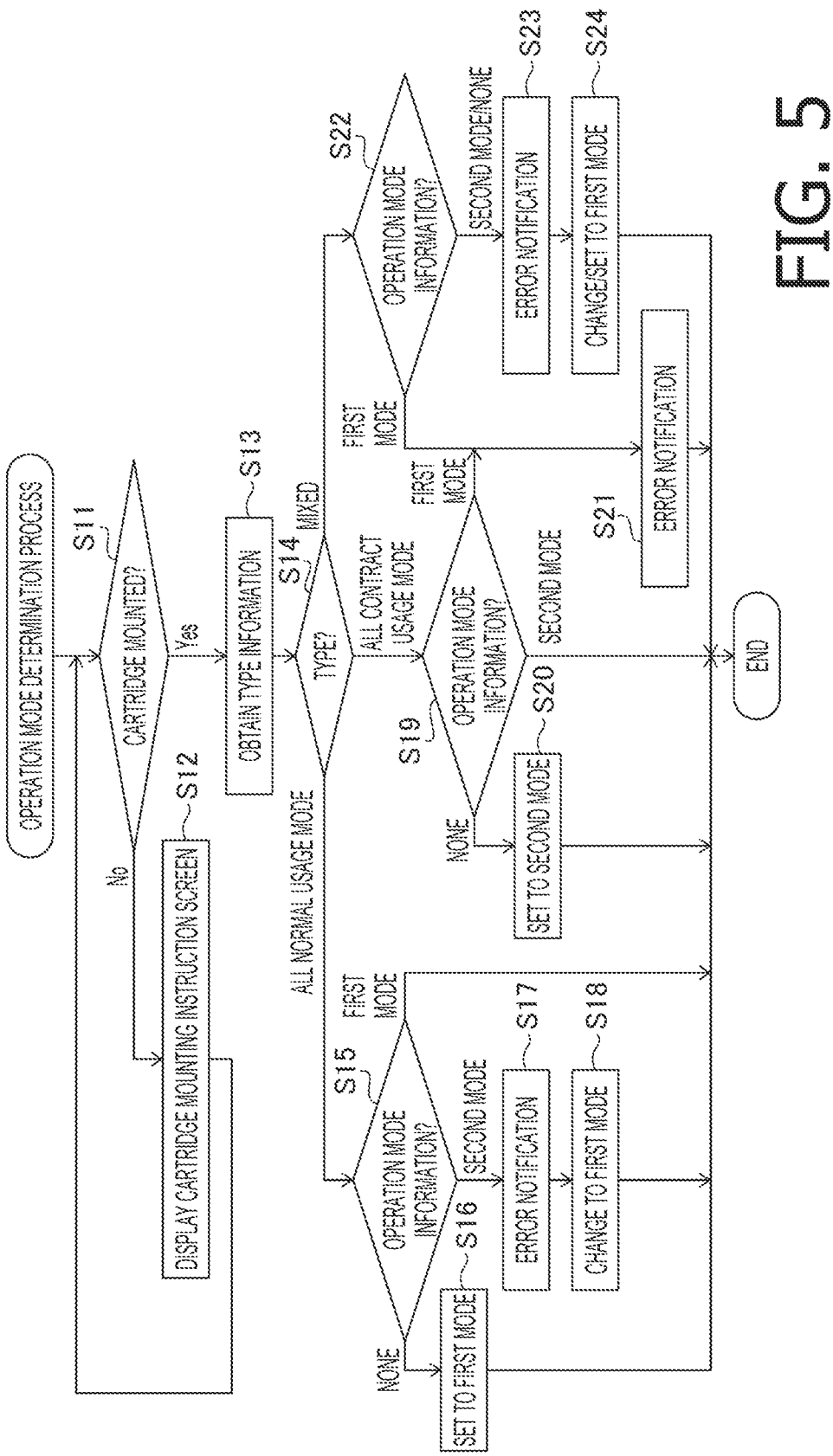
FIG. 5 is a flowchart of a mode determination process.

The printer 10 is a printer that can be used in both the normal usage mode and the contract usage mode. The controller 51 of the printer 10 executes an operation mode determination process of determining whether to operate in the normal usage mode or in the contract usage mode. The operation mode determination process will be described with reference to FIG. 5. A process of storing the setting information in the information processing device 11 and a process of taking over the setting information from the information processing device 11 are executed only in the contract usage mode. Details will be described later.

For example, the controller 51 periodically executes the operation mode determination process. Alternatively, the controller 51 executes the operation mode determination process in response to the printer 10 being turned on. First, the controller 51 executes a process corresponding to a determination on whether or not the cartridge 13 is mounted in the mounting case 32 (S11). Specifically, the controller 51 determines whether or not the controller 51 is capable of communicating with the IC chip 14 through the cartridge I/F 49. The controller 51 determines that the cartridge 13 is mounted in the mounting case 32 based on the fact that the controller 51 can communicate with the IC chip 14 through the cartridge I/F 49 (S11: Yes). The controller 51 determines that the cartridge 13 is not mounted in the mounting case 32 based on the fact that the controller 51 cannot communicate with the IC chip 14 through the cartridge I/F 49 (S11: No). That is, the IC chip 14 is used for determining whether the cartridge 13 is mounted in the mounting case 32 or not. It is noted that the controller 51 may execute a process other than the above-described process as long as the process corresponds to the determination on whether or not the cartridge 13 is mounted in the mounting case 32.

The controller 51 executes the determination of step S11 for all the cartridges 13 that are mounted in the mounting case 32. When it is determined that at least one cartridge 13 is not mounted in the mounting case 32 (S11: No), the controller 51 causes the display panel 43 to display a cartridge mounting instruction screen (S12). Specifically, the controller 51 reads image data indicating the cartridge mounting instruction screen which is stored in advance in the ROM 55 of the memory 53, and outputs the image data to the display panel 43. The cartridge mounting instruction screen is, for example, a screen including characters indicating opening of the cover 22 and mounting of the cartridge 13 to the mounting case 32.

The controller 51 causes the display panel 43 to display the cartridge mounting instruction screen until it is determined that all the cartridges 13 are mounted in the mounting case 32. When it is determined that all the cartridges 13 are mounted in the mounting case 32 (S11: Yes), the controller 51 obtains the above-described type information from the IC memory 15 through the cartridge I/F 49 (S13). Then, the controller 51 determines whether pieces of the type information obtained from the IC memories 15 of all the cartridges 13 mounted in the mounting case 32 all indicate the normal usage mode, all indicate the contract usage mode, or are a mixture of indications of the normal usage mode and the contract usage mode (S14). Specifically, the controller 51 determines whether the pieces of obtained type information are all "0," all "1," or a mixture of "0" and "1," where "0" indicates the normal usage mode and "1" indicates the contract usage mode. When the model number of the cartridge 13 indicates a usage mode, the controller 51 obtains the model number from the IC memory 15. Then, the controller 51 determines whether or not the obtained model number matches the model number stored in advance in the memory 53 as a model number indicating the normal usage mode, and whether or not the obtained model number matches a model number stored in advance in the memory 53 as the model number indicating the contract usage mode.

When it is determined that the pieces of obtained type information all indicate the normal usage mode (S14: all normal usage mode), the controller 51 determines whether the operation mode information stored in the memory 53 indicates the first mode, the second mode, or no operation mode (S15). The operation mode information is information that the controller 51 stores in the EEPROM 57 of the memory 53 in response to the determination of the operation mode. The operation mode information is, for example, a first mode flag and a second mode flag stored in the EEPROM 57. The first mode flag having a value of "ON" indicates the first mode. The second mode flag having a value of "ON" indicates the second mode. The first mode flag and the second mode flag having values "OFF" indicate that the operation mode has not been determined. Initial values of the first mode flag and the second mode flag are both "OFF." The first mode indicates the normal usage mode. The second mode indicates the contract usage mode.

In response to the first mode flag having the value of "OFF" and the second mode flag having the value of "OFF" being stored in the EEPROM 57, the controller 51 determines that the operation mode information does not indicate the operation mode (S15: none). When it is determined that the operation mode information does not indicate the operation mode (S15: none), the controller 51 sets the operation mode to the first mode (S16) and ends the operation mode determination process. Specifically, the controller 51 stores the first mode flag having the value of "ON" in the EEPROM 57. That is, when the cartridges 13 all of which are in the normal usage mode are mounted in the mounting case 32 of the printer 10 in which the operation mode is not determined, the operation mode is set to the first mode. In response to the first mode flag having the value of "ON" and the second mode flag having the value of "OFF" being stored in the EEPROM 57, the controller 51 determines that the operation mode information indicates the first mode (S15: first mode). When it is determined that the operation mode information indicates the first mode (S15: first mode), the controller 51 ends the operation mode determination process. That is, when the cartridges 13, all of which are for the normal usage mode, are mounted in the mounting case 32 of the printer 10 in which the operation mode is set to the first mode, the operation mode is maintained in the first mode. In response to the first mode flag having the value of "OFF" and the second mode flag having the value of "ON" being stored in the EEPROM 57, the controller 51 determines that the operation mode information indicates the second mode (S15: second mode). When it is determined that the operation mode information indicates the second mode (S15: second mode), the controller 51 performs an error notification (S17). Specifically, the controller 51 reads image data indicating an error display screen stored in advance in the ROM 55 of the memory 53, and inputs the read image data to the display panel 43. That is, when the cartridges 13, all of which are for the normal usage mode, are mounted in the mounting case 32 of the printer 10 in which the operation mode is set to the second mode, the error display screen is displayed on the display panel 43. The error display screen includes, for example, characters "An appropriate cartridge is not mounted. Please mount an appropriate cartridge," an "OK" icon, and a "cancel" icon. Although not shown in the flowchart, in response to the selection of the "OK" icon on the error display screen, the controller 51 executes the processes on and after step S11 again. For example, the user remounts the cartridge 13 for the contract usage mode, which is the appropriate cartridge 13, to the mounting case 32, and then selects the "OK" icon on the error display screen. When it is determined that the "cancel" icon is selected on the error display screen, the controller 51 changes the operation mode to the first mode (S18), and ends the operation mode determination process. Specifically, the controller 51 stores the first mode flag having the value of "ON" in the EEPROM 57, and stores the second mode flag having the value of "OFF" in the EEPROM 57.

When it is determined in step S14 that all the pieces of obtained type information indicates the contract usage mode (S14: all contract usage mode), the controller 51 executes the process of step S19 which is similar to the process of step S15. Specifically, in S19, the controller 51 determines whether the operation mode information stored in the memory 53 indicates the first mode, the second mode, or no operation mode. As described above, the operation mode information is, for example, the first mode flag and the second mode flag stored in the EEPROM 57. When it is determined that the operation mode information stored in the EEPROM 57 does not indicate the operation mode (S19: none), the controller 51 sets the operation mode to the second mode (S20) and ends the operation mode determination process. Specifically, the controller 51 stores the second mode flag having the value of "ON" in the EEPROM 57. That is, when the cartridges 13, all of which are for the contract usage mode, are mounted in the mounting case 32 of the printer 10 in which the operation mode is not set, the operation mode is set to the second mode. When it is determined that the operation mode information stored in the EEPROM 57 indicates the second mode (S19: second mode), the controller 51 ends the operation mode determination process. That is, when the cartridges 13, all of which are for the contract usage mode, are mounted in the mounting case 32 of the printer 10 in which the operation mode is set to the second mode, the operation mode is maintained in the second mode. When it is determined that the operation mode information stored in the EEPROM 57 indicates the first mode (S19: first mode), the controller 51 performs an error notification which is a process similar to the process in step S17 (S21). Specifically, in S21, the controller 51 reads image data indicating an error display screen stored in advance in the ROM 55 of the memory 53, and inputs the read image data to the display panel 43. The error display screen includes, for example, characters "An appropriate cartridge is not mounted. Please mount an appropriate cartridge," an "OK" icon, and a "cancel" icon. That is, when the cartridges 13, all of which are for the contract usage mode, are mounted in the mounting case 32 of the printer 10 in which the operation mode is set to the first mode, the operation mode is maintained in the first mode. Although not shown in the flowchart, the controller 51 executes the processes on after step S11 again in response to the selection of the "OK" icon on the error display screen. For example, the user remounts the cartridges 13 for the normal usage mode, which is the appropriate cartridges 13, to the mounting case 32, and then selects the "OK" icon on the error display screen. When it is determined that the "cancel" icon is selected on the error display screen, the controller 51 ends the operation mode determination process.

When it is determined in step S14 that the pieces of obtained type information are a mixture of the normal usage mode and the contract usage mode (S14: mixed), the controller 51 executes the process of step S22 which is similar to the process of step S15. In S22, the controller 51 determines whether the operation mode information stored in the memory 53 indicates the first mode, the second mode, or no operation mode. As described above, the operation mode information is, for example, a first mode flag and a second mode flag stored in the EEPROM 57. When it is determined that the operation mode information stored in the EEPROM 57 indicates the first mode (S22: first mode), the controller 51 performs the process of step S21 described above. That is, when the cartridge 13 for the normal usage mode and the cartridge 13 for the contract usage mode are mounted in the mounting case 32 of the printer 10 in which the operation mode is set to the first mode, the error display screen is displayed and then the first mode is maintained. When it is determined that the operation mode information stored in the EEPROM 57 indicates the second mode, or when it is determined that the operation mode information does not indicate the operation mode (S22: second mode/none), the controller 51 executes an error notification (S23). Specifically, the controller 51 reads image data indicating an error display screen stored in advance in the ROM 55 of the memory 53, and inputs the read image data to the display panel 43. The error display screen includes, for example, characters "An appropriate cartridge is not mounted. Please mount an appropriate cartridge," an "OK" icon, and a "cancel" icon. When it is determined that the "cancel" icon is selected on the error display screen, the controller 51 changes the operation mode to the first mode or sets the operation mode to the first mode (S24), and ends the operation mode determination process. That is, when the cartridge 13 for the normal usage mode and the cartridge 13 for the contract usage mode are mounted in the mounting case 32 of the printer 10 in which the operation mode is set to the second mode, the error display screen is displayed and then the operation mode is changed to the first mode. Specifically, the first mode flag having the value of "ON" is stored in the EEPROM 57, and the second mode flag having the value of "OFF" is stored in the EEPROM 57. When the cartridge 13 for the normal usage mode and the cartridge 13 for the contract usage mode are mounted in the mounting case 32 of the printer 10 in which the operation mode is not set, the error display screen is displayed, and then the operation mode is set to the first mode. Specifically, the first mode flag having the value of "ON" is stored in the EEPROM 57.

There is a case where a cartridge 13 whose type information is not stored in the IC memory 15 is mounted in the mounting case 32. When it is determined that the type information cannot be obtained from the IC memory 15 through the cartridge I/F 49, the controller 51 may execute the operation mode determination process while assuming that the type information indicating the normal usage mode is obtained. That is, when the cartridge 13 in which the type information is not stored in the IC memory 15 is mounted in the mounting case 32, the operation mode is set to the first mode, is maintained in the first mode, or is changed from the second mode to the first mode.

Figure 6A:
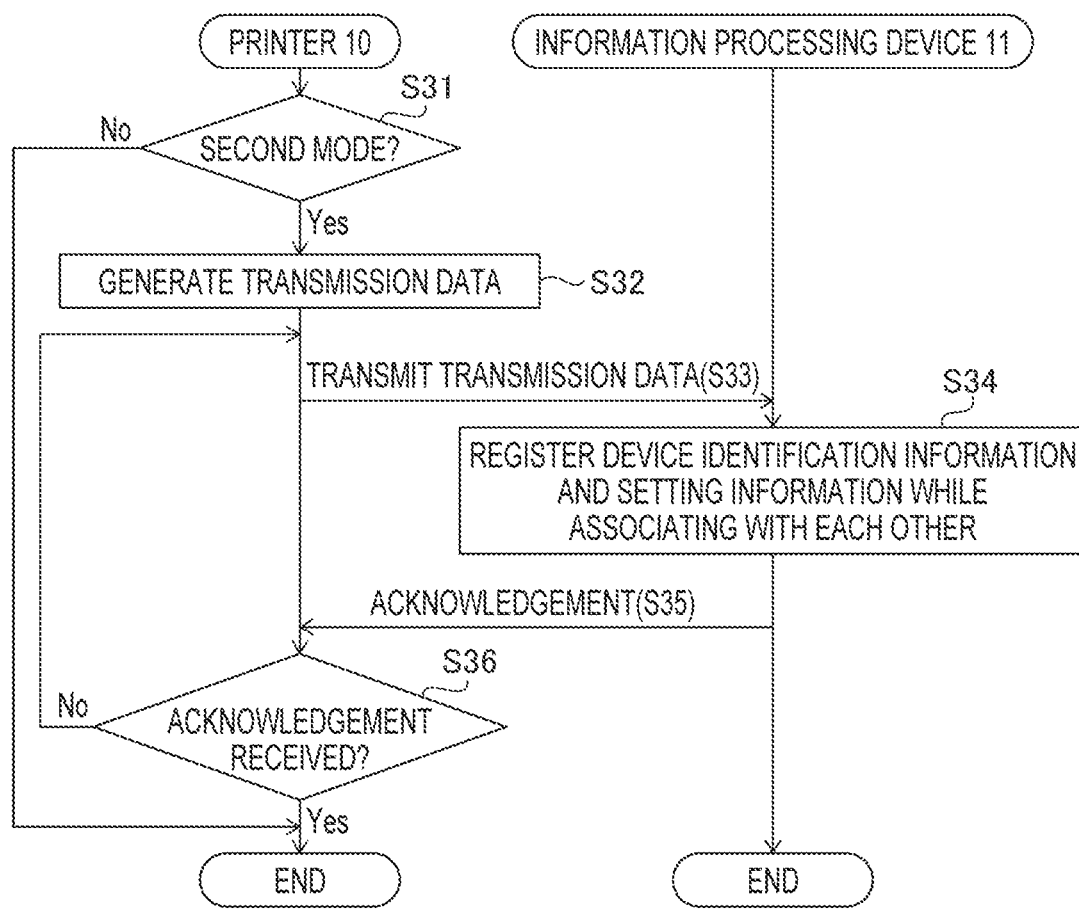
FIG. 6A is a diagram illustrating a backup process according to the embodiment.

The controller 51 executes a backup process illustrated in FIG. 6A in response to the second flag having the value of "ON" being stored in the EEPROM 57 of the memory 53. The backup process is a process of storing the setting information stored in the EEPROM 57 of the memory 53 in the memory 66 of the information processing device 11. That is, the backup process is performed only when the operation mode of the printer 10 is the second mode. The backup process will be described in detail with reference to FIGS. 6A and 4.

The controller 51 executes the backup process, for example, every day at a fixed time, every predetermined period such as two days, or every time the setting information is changed or newly set. First, the controller 51 executes a process corresponding to a determination on whether or not the operation mode is the second mode (S31). Specifically, the controller 51 determines whether or not the second mode flag having the value of "ON" is stored in the EEPROM 57 of the memory 53. When the second mode flag having the value of "ON" is stored in the EEPROM 57, the controller 51 determines that the operation mode is the second mode, and when the second mode flag having the value of "OFF" is stored in the EEPROM 57, the controller 51 determines that the operation mode is not the second mode. When it is determined that the operation mode is not the second mode (S31: No), the controller 51 ends the backup process. When it is determined that the operation mode is the second mode (S31: Yes), the controller 51 generates transmission data (S32). The transmission information includes the setting information stored in the EEPROM 57 of the memory 53, the device identification information, and a backup instruction. The backup instruction is, for example, a command. The command is accompanied by setting information. The controller 51 transmits a request including the generated transmission data, through the communication I/F 47 and the Internet 12, to the information processing device 11 which is identified by the transmission address stored in the EEPROM 57 (S33). The request generated by the controller 51 is a request based on a communication protocol such as HTTP or HTTPs.

The controller 61 of the information processing device 11 receives the request transmitted by the printer 10 through the communication I/F 64 (S33). The controller 61 stores the setting information included in the request in the memory 66 based on the backup instruction included in the received request. Specifically, first, the controller 61 determines whether or not a record having device information that matches the device identification information included in the received request is present in the backup database. When it is determined that the record having device information that matches the device identification information included in the received request is not present in the backup database, the controller 61 generates a new record. Specifically, the controller 61 associates the device identification information with the setting information, each included in the received request, and registers them as a new record in the backup database (S34). FIG. 4A illustrates the backup database before a new record is registered. FIG. 4B illustrates the backup database in which a new record is registered. In the illustrated example, in the new record, the device identification information "A-001" is associated with "backup1.bin" which is binary information indicating the setting information. On the other hand, when it is determined that a record having the device information that matches the device identification information included in the received request exists in the backup database, the controller 61 updates the setting information. Specifically, the controller 61 specifies a record having the device information that matches the device identification information included in the received request, and newly registers the setting information included in the received request in place of the setting information of the specified record. When the registration of the record in the backup database is completed, the controller 61 generates a response including an acknowledgement (ACK) as a reply to the received request, and returns the response to the printer 10 (S35).

After the transmission of the transmission data, the controller 51 of the printer 10 determines whether or not the acknowledgement is received within a predetermined time defined by the communication protocol (S36). When it is determined that the acknowledgement has been received (S36: Yes), the controller 51 ends the backup process. When it is determined that the acknowledgement has not been received (S36: No), the controller 51 executes a retry being a retransmission of the transmission data (S33).

Figure 7:
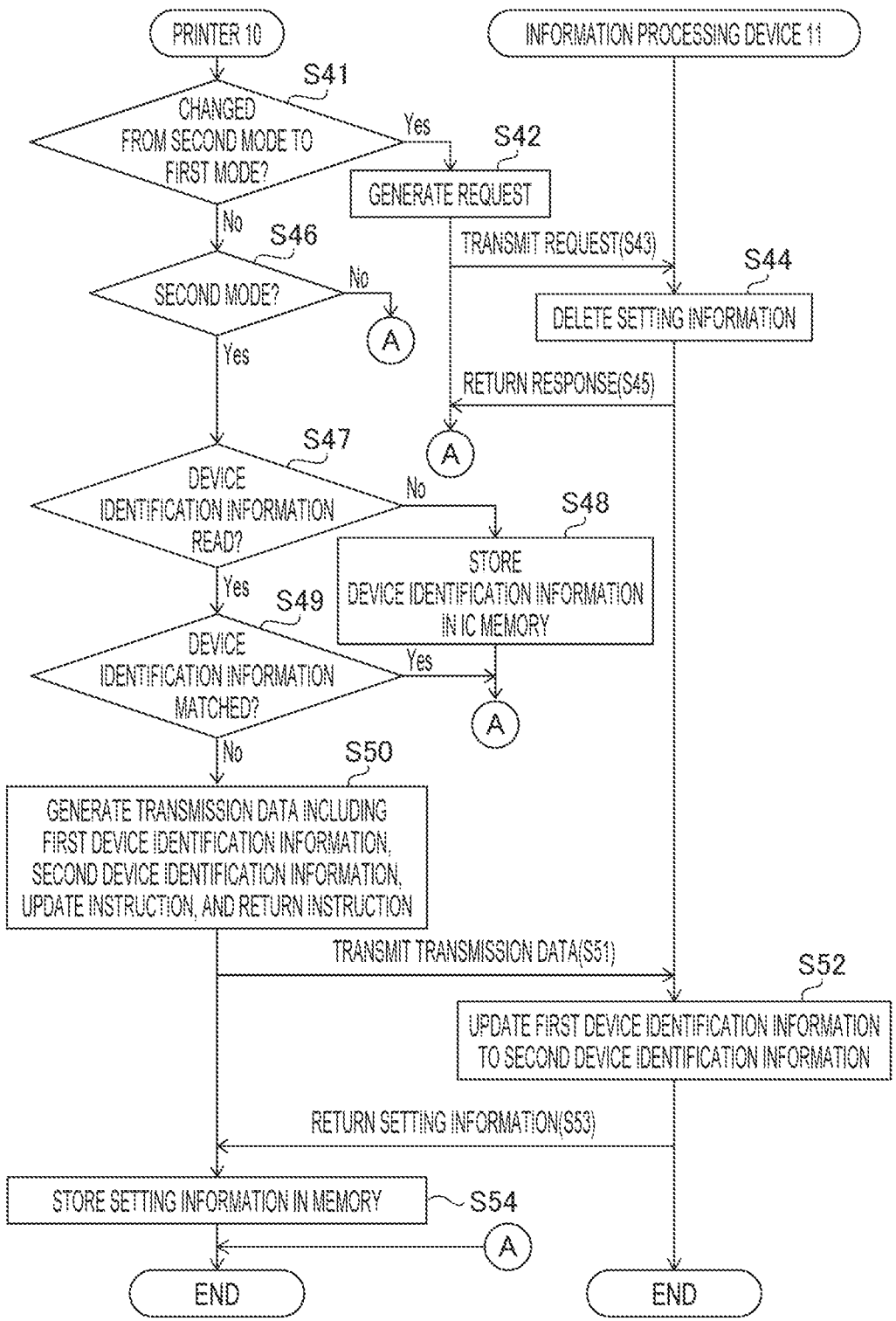
FIG. 7 is a diagram illustrating a process to be executed by a controller of the printer and a controller of the information processing device according to the embodiment.

Next, a process executed by the controller 51 of the printer 10 when the cartridge 13 is replaced or when the printer 10A is replaced with the printer 10B will be described with reference to FIGS. 7 and 4. The controller 51 executes the process shown in FIG. 7 in response to, for example, replacement of the cartridge 13 or input of a specific instruction through the touch sensor 44 or the like on the replaced printer 10B. First, the controller 51 of the printer 10 determines whether or not the operation mode has been changed from the second mode to the first mode (S41). As described in the above operation mode determination process (FIG. 5), when the cartridge 13 is replaced, the operation mode may be changed from the second mode to the first mode (S18). For example, after executing the process of step S18 of the operation mode determination process described above, the controller 51 stores the mode change flag having the value of "ON" in the EEPROM 57. Then, in step S41, the controller 51 determines whether or not the value of the mode change flag is "ON." In response to the value of the mode change flag being "ON," the controller 51 determines that the operation mode has been changed from the second mode to the first mode. In response to the value of the mode change flag being "OFF," the controller 51 determines that the operation mode has not been changed from the second mode to the first mode. The initial value of the mode change flag is "OFF."

When it is determined that the operation mode has been changed from the second mode to the first mode (S41: Yes), the controller 51 of the printer 10 generates a request including a deletion instruction and the device identification information stored in the EEPROM 57 (S42). The deletion instruction is, for example, a command for instructing to delete the setting information. The command carries device identification information. The controller 51 transmits the generated request to the information processing device 11 indicated by the transmission address stored in the EEPROM 57 via the communication I/F 47 and the Internet 12 (S43). For example, when the cartridge 13 for the normal usage mode is mounted in the mounting case 32 of the printer 10 operating in the second mode, the printer 10 transmits the request including the deletion instruction to the information processing device 11.

The controller 61 of the information processing device 11 receives the request including the deletion instruction (S43). The controller 61 specifies, in the backup database, a record having device identification information that matches the device identification information included in the received request. Then, the controller 61 deletes the identified record from the backup database in accordance with the deletion instruction (S44). FIG. 4C shows a state in which the identified record is deleted from the backup database. It is noted that, in the backup database, a deletion history indicating that the setting information has been deleted may be left or may not be left. The deletion history is, for example, a deletion flag included in the record. For example, the deletion flag having a value of "ON" indicates that the record has been deleted. The deletion flag having the value of "OFF" indicates that the record has not been deleted. In response to the deletion of the identified record, the controller 61 returns a response including an acknowledgement indicating the deletion of the record to the printer 10 though the communication I/F 64 and the Internet 12 (S45).

The controller 51 of the printer 10 receives the response transmitted by the information processing device 11 through the communication I/F 47 (S45). Although not shown in the flowchart, until the controller 51 receives the response including the acknowledgement, the controller 51 performs a retry being a retransmission of the request. Further, in response to receiving the acknowledgement, the controller 51 stores the mode change flag having the value of "OFF" in the EEPROM 57, and ends the process.

When it is determined that the operation mode has not been changed from the second mode to the first mode (S41: No), the controller 51 of the printer 10 determines whether or not the operation mode is the second mode (S46). Specifically, the controller 51 determines whether or not the second mode flag having the value of "ON" is stored in the EEPROM 57 of the memory 53. When it is determined that the operation mode is not the second mode (S46: No), the controller 51 ends the process. For example, when the cartridge 13 is replaced in the printer operating in the first mode, the controller 51 determines in step S46 that the mode is not the second mode, and ends the process.

When it is determined that the operation mode is the second mode (S46: Yes), the controller 51 of the printer 10 determines whether or not the device identification information has been read from the IC memory 15 through the cartridge I/F 49 (S47). The device identification information is stored in the IC memory 15 of the cartridge 13 mounted in the mounting case 32 in step S48 described later. That is, when the cartridge 13 mounted in the mounting case 32 is a new cartridge 13, the device identification information is not stored in the IC memory 15 of the cartridge 13. That is, in step S47, it is determined whether or not the cartridges 13 mounted in the mounting case are cartridges 13 that were mounted in the mounting case 32 before. When it is determined that the device identification information cannot be read from the IC memory 15 (S47: No), the controller 51 stores the device identification information stored in the EEPROM 57 in the IC memory 15 through the cartridge I/F 49 (S48) and ends the process. That is, when a new cartridge 13 is mounted to the mounting case 32, the device identification information assigned to the printer 10 is stored in the IC memory 15 of the mounted cartridge 13.

When it is determined that the device identification information has been read from the IC memory 15 (S47: Yes), the controller 51 of the printer 10 determines whether or not the read device identification information matches the device identification information stored in EEPROM 57 (S49). For example, when the cartridge 13 is detached from a mounting case 32 and then mounted to the mounting case 32 again, the device identification information read from the IC memory 15 matches the device identification information stored in the EEPROM 57. When the cartridge 13 that was mounted in the mounting case 32 of the printer 10A before the replacement is mounted in the mounting case 32 of the printer 10B after the replacement, the device identification information read from the IC memory 15 does not match the device identification information stored in the EEPROM 57. That is, in step S49, it is determined whether or not the printer 10 has been replaced. An operator who replaces the printer 10A with the printer 10B removes all the cartridges 13 mounted in the printer 10A or specific cartridges 13 (i.e., at least one of the cartridges 13) from the printer 10A and mounts the cartridges to the mounting case 32 of the printer 10B. This operation is an operation that the vendor of the printer 10 specifies to the service provider.

When it is determined that the device identification information read from the IC memory 15 matches the device identification information stored in the EEPROM 57 (S49: Yes), the controller 51 of the printer 10 ends the process. When it is determined that the device identification information read from the IC memory 15 does not match the device identification information stored in the EEPROM 57 (S49: No), the controller 51 executes the processes on and after step S50 being processes of obtaining the setting information backed up in the information processing device 11. It is noted that the determination as to whether or not the device identification information read from the IC memory 15 matches the device identification information stored in the EEPROM 57 may be executed for all the cartridges 13 mounted in the mounting case 32. Alternatively, the determination may be executed only for the specific cartridges 13. For example, the controller 51 determines that "S47: No" when all the pieces of device identification information read from the IC memories 15 of all the cartridges 13 mounted in the mounting case 32 match with each other but do not match the device identification information stored in the EEPROM 57. Since the determination on whether or not the pieces of device identification information match with each other is made for all the cartridges 13 mounted in the mounting case 32, it is not determined that the printer 10 is replaced when certain cartridge 13 that was used in another printer is mounted in the mounting case 32. That is, the controller 51 can more accurately determine whether or not the printer 10 has been replaced than by making the determination on whether or not the pieces of device identification information match with each other only for the certain cartridge 13 that has been mounted to the mounting case 32. In the following description, the device identification information of the printer 10A before the replacement read by the controller 51 of the printer 10 from the IC memory 15 is referred to as first device identification information, and the device identification information of the printer 10B after the replacement stored in the EEPROM 57 is referred to as second device identification information.

When it is determined that the first device identification information do not match the second device identification information (S49: No), the controller 51 of the printer 10B generates transmission data including the first device identification information, the second device identification information, a first update instruction, and a return instruction (S50). The first update instruction is an instruction for requesting update of information registered in the backup database. The return instruction is an instruction for requesting to return the setting information registered in the backup database. The first update instruction is, for example, a command accompanied by the first device identification information and the second device identification information. The return instruction is, for example, a command accompanied by the first device identification information or the second device identification information. The controller 51 transmits the request including the generated transmission data to the information processing device 11 indicated by the transmission address stored in the EEPROM 57 through the communication I/F 47 and the Internet 12 (S51).

The controller 61 of the information processing device 11 receives the request transmitted by the printer 10B through the communication I/F 64 (S51). The controller 61 updates the information registered in the backup database in accordance with the first update instruction included in the received request (S52). Specifically, first, the controller 61 specifies, in the backup database, a record having device identification information that matches the first device identification information included in the received request. Then, as illustrated in FIG. 4D, the controller 61 deletes the specified record and newly registers a record including the second device identification information included in the received request in the backup database. In the new record, the second device identification information is associated with "backup1.bin" which is the setting information included in the deleted record. That is, the second device identification information given to the printer 10B after the replacement and the setting information that had been set in the printer 10A before the replacement are associated with each other and newly registered in the backup database. An update history indicating that an old record is deleted and a new record is registered may be left or may not be left in the backup database.

Next, the controller 61 of the information processing device 11 specifies a record in the backup database that matches the second device identification information in accordance with the return instruction included in the received request. The controller 61 specifies the setting information included in the specified record, and reads the specified setting information from the memory 66. Then, the controller 61 generates a response including the read setting information and returns the response to the printer 10B through the communication I/F 64 (S53).

The controller 51 of the printer 10B receives the response transmitted by the information processing device 11 through the communication I/F 47 (S53). It is noted that, if the controller 51 does not receive the response within a particular period after the transmission of the transmission data (S51), the controller 51 executes a retry being a retransmission of the transmission data (S51). The controller 51 stores the setting information included in the received response in the EEPROM 57 of the memory 53 (S54), and ends the process. That is, the setting information of the printer 10A is taken over to the printer 10B.

Effects of Embodiment

In order for the information processing device 11 to transmit the setting information of the printer 10A to the printer 10B, it is necessary to specify the printer 10A and the printer 10B. In the present embodiment, the controller 51 of the printer 10B obtains the first device identification information assigned to the printer 10A from the IC memory 15 of the cartridge 13 mounted in the mounting case 32. Then, the controller 51 transmits the obtained first device identification information and the second device identification information assigned to the printer 10B to the information processing device 11. Therefore, the controller 61 of the information processing device 11 can specify the setting information to be transmitted to the printer 10B on the backup database. As a result, the printer 10 can cause another printer to take over the setting information, and can also take over the setting information from another printer. In addition, the printer 10 can reduce an operator's duty to input information associating the printer 10A with the printer 10B to the information processing device 11.

The controller 51 of the printer 10B transmits the first device identification information, the second device identification information, and the first update instruction to the information processing device 11 to update the record registered in the backup database managed by the information processing device 11. Therefore, the printer 10B can cause the information processing device 11 to continuously manage the second device identification information assigned to the printer 10B and the setting information in association with each other without newly transmitting the setting information to the information processing device 11.

The controller 51 of the printer 10 transmits the return instruction to the information processing device 11 (S51) in response to acquisition of the device identification information from the IC memory 15 of every cartridge 13 mounted in the mounting case 32 (S47: Yes). Therefore, for example, in a case where only one cartridge 13 is replaced, the return instruction is prevented from being erroneously transmitted to the information processing device 11.

After setting the operation mode to the second mode, the controller 51 of the printer 10 changes the operation mode from the second mode to the first mode in response to the mounting of the cartridge 13 for the normal usage mode to the mounting case 32 (S18). In response to changing the operation mode from the second mode to the first mode (S41: Yes), the controller 51 transmits the request including the deletion instruction to the information processing device 11 (S43). Therefore, the printer 10 can prevent the backed-up setting information from being erroneously taken over by another printer when an inappropriate cartridge 13 that is not for the contract usage mode is mounted in the mounting case 32.

[Variation]

In the above-described embodiment, an example has been described in which the information processing device 11 specifies the printer 10A before the replacement and the printer 10B after the replacement based on the device identification information. In the present variation, an example will be described in which a CTG serial number assigned to the cartridge 13 is used in place of the device identification information. In the following description, the same processes as those described in the embodiment are denoted by the same step numbers, and descriptions thereof will be omitted. In addition, among configurations of the printer 10 and processes executed by the printer 10 described in the present variation, configurations and processes other than those described below are the same as the configurations and the processes described in the embodiment. It is noted that, in the present variation, the device identification information assigned to the printer 10 is not stored in the IC memory 15 of the cartridge 13.

Figure 6B:
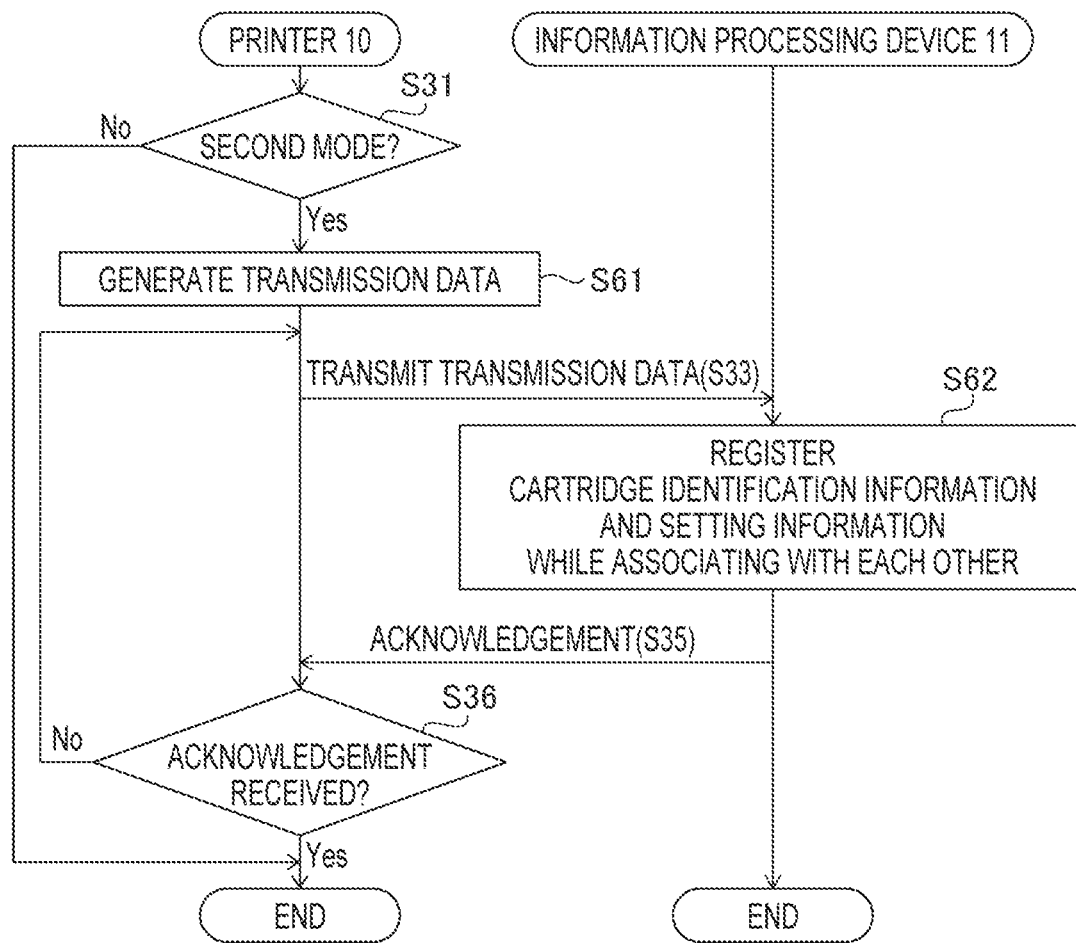
FIG. 6B is a diagram illustrating a backup process according to the variation.

The controller 51 of the printer 10 executes a backup process shown in FIG. 6B in place of the backup process shown in FIG. 6A. When it is determined that the operation mode is the second mode (S31: Yes), the controller 51 generates transmission data (S61). The transmission data includes CTG serial numbers, the setting information, and the backup instruction. The CTG serial numbers are the CTG serial numbers stored in the IC memories 15 of all the cartridges 13 mounted in the mounting case 32. The controller 51 reads the CTG serial numbers from the EEPROM 57 and includes the read CTG serial numbers in the transmission data. In step S72 (FIG. 8) described later, when the cartridge 13 is replaced, the controller 51 reads the CTG serial number from the IC memory 15 through the cartridge I/F 49 and stores the read CTG serial number in the EEPROM 57. That is, the transmission data generated in step S61 includes the CTG serial numbers of the cartridges 13 mounted in the mounting case 32. The controller 51 concatenates all the CTG serial numbers read from the EEPROM 57 in a particular order and includes in the transmission data. For example, four CTG serial numbers are concatenated in an order of the CTG serial number assigned to the magenta cartridge 13, the CTG serial number assigned to the cyan cartridge 13, the CTG serial number assigned to the yellow cartridge 13, and the CTG serial number assigned to the black cartridge 13. In the following description, the concatenated CTG serial numbers will be referred to as cartridge identification information.

The controller 51 transmits a request including the generated transmission data to the information processing device 11 indicated by the transmission address stored in the EEPROM 57 through the communication I/F 47 and the Internet 12 (S33).

The controller 61 of the information processing device 11 receives the request transmitted by the printer 10 through the communication I/F 64 (S33). The controller 61 stores the setting information included in the request in the memory 66 based on the backup instruction included in the received request. Specifically, first, the controller 61 determines whether or not there is a record having cartridge identification information that matches the cartridge identification information included in the received request in the backup database. When it is determined that there is no record having the cartridge identification information that matches the cartridge identification information included in the received request in the backup database, the controller 61 generates a new record. Specifically, the controller 61 associates the cartridge identification information and the setting information included in the received request with each other, and registers the associated information as a new record in the backup database (S62). FIG. 4E illustrates the backup database before the new record is registered. FIG. 4F illustrates the backup database after the new record is registered. In the illustrated example, in the new record, the cartridge identification information "M11C11Y11Bk11" and binary data "backup1.bin" indicating the setting information are associated with each other. On the other hand, when it is determined that there is the record having the cartridge identification information that matches the cartridge identification information included in the received request in the backup database, the controller 61 updates the setting information. Specifically, the controller 61 specifies a record having cartridge identification information that matches the cartridge identification information included in the received request, and newly registers the setting information included in the received request in place of the setting information of the specified record (S62).

Figure 8:
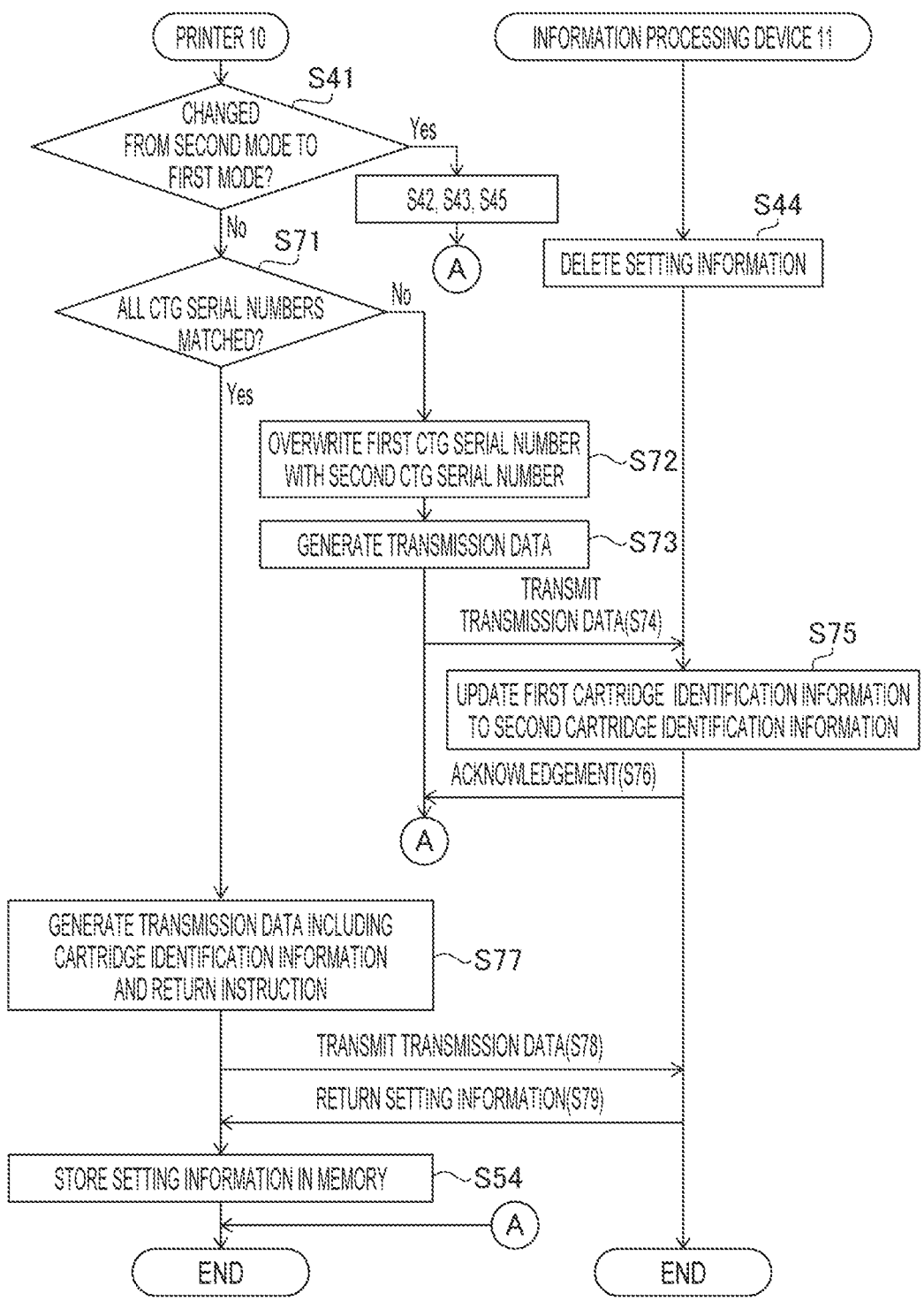
FIG. 8 is a diagram illustrating a process to be executed by the controller of the printer and the controller of the information processing device according to the variation.

Processes shown in FIG. 8 will be described that the controller 51 of the printer 10 and the controller 61 of the information processing device 11 execute in place of the processes shown in FIG. 7 described in the embodiment. The controllers 51 and 61 execute the processes shown in FIG. 8 in response to, for example, replacement of the cartridge 13 or input of a specific instruction through the touch sensor 44 or the like on the replaced printer 10B. First, as in the above-described embodiment, the controller 51 of the printer 10 executes the process of step S41. Then, as in the above-described embodiment, when it is determined that the operation mode has been changed from the second mode to the first mode (S41: Yes), the controller 51 executes the processes of steps S42 to S45. That is, when the cartridge 13 for the normal usage mode is mounted in the mounting case 32 of the printer 10 operating in the second mode, the deletion instruction is transmitted from the printer 10 to the information processing device 11, and the record of the backup database is deleted.

On the other hand, when it is determined that the operation mode has not been changed from the second mode to the first mode (S41: No), the controller 51 of the printer 10 determines whether or not all the cartridges 13 mounted in the mounting case 32 have been replaced (S71). In this variation, when replacing the printer 10A with the printer 10B, the operator who performs the replacement mounts all the cartridges 13 that were mounted in the mounting case 32 of the printer 10A before the replacement to the mounting case 32 of the printer 10B after the replacement. That is, in step S71, it is determined whether or not the printer 10A has been replaced with the printer 10B. Specifically, the controller 51 determines whether or not all the CTG serial numbers stored in the IC memory 15 of the cartridges 13 mounted in the mounting case 32 do not match the CTG serial numbers stored in the EEPROM 57 of the memory 53 (S71). Whether or not the CTG serial numbers match with each other is determined for each of the magenta cartridge 13, the cyan cartridge 13, the yellow cartridge 13, and the black cartridge 13.

When the printer 10A is replaced with the printer 10B, all the CTG serial numbers stored in the IC memories 15 and the CTG serial numbers stored in the EEPROM 57 do not match. Furthermore, when one cartridge 13 in which ink has been used up is replaced, the CTG serial number of one cartridge 13 stored in the IC memory 15 does not match one CTG serial number stored in the EEPROM 57. A case in which the controller 51 determines that the printer 10 has been replaced when all the cartridges 13 mounted in the mounting case 32 have been used up and replaced will be described later. In a state in which the printer 10 is initialized, the EEPROM 57 does not store the CTG serial number. When it is determined that no CTG serial number is stored in the EEPROM 57, the controller 51 determines that all the CTG serial numbers stored in the IC memory 15 do not match the CTG serial number stored in the EEPROM 57 (S71: Yes). In the following description, the CTG serial number stored in the EEPROM 57 is referred to as a first CTG serial number, and the CTG serial number read from the IC memory 15 by the controller 51 through the cartridge I/F 49 is referred to as the second CTG serial number.

When it is determined that at least one second CTG serial number matches at least one first CTG serial number (S71: No), the controller 51 of the printer 10 overwrites the first CTG serial number with the second CTG serial number (S72). That is, when one to three cartridges 13 that were mounted in the mounting case 32 are replaced, the CTG serial numbers of the replaced cartridges 13 are stored in the EEPROM 57. Then, the controller 51 generates transmission data (S73). The transmission data includes a second update instruction, the above-described cartridge identification information generated by concatenating the first CTG serial numbers, and the above-described cartridge identification information generated by concatenating the second CTG serial numbers. In the following description, the cartridge identification information generated by concatenating the first CTG serial numbers is referred to as first cartridge identification information, and the cartridge identification information generated by concatenating the second CTG serial numbers is referred to as second cartridge identification information. The second update instruction is, for example, a command accompanied by the first cartridge identification information and the second cartridge identification information. The controller 51 of the printer 10 transmits the request including the generated transmission data to the information processing device 11 indicated by the transmission address stored in the EEPROM 57 via the communication I/F 47 and the Internet 12 (S74).

The controller 61 of the information processing device 11 receives the request transmitted by the printer 10 through the communication I/F 64 (S74). The controller 61 updates the information registered in the backup database in accordance with the second update instruction included in the received request (S75). Specifically, first, the controller 61 specifies, in the backup database, a record having cartridge identification information that matches the first cartridge identification information included in the received request. Then, the controller 61 registers the second cartridge identification information included in the received request in the backup database in place of the cartridge identification information of the specified record. FIG. 4F illustrates the backup database before being updated, and FIG. 4G illustrates the backup database after being updated. In the illustrated example, in the printer 10, the black cartridge 13 is replaced, and the CTG serial number "Bk11" of the black cartridge 13 is changed to "Bk12". The controller 61 returns a response including an acknowledgement indicating that the record of the backup database is updated to the printer 10 through the communication I/F 64 and the Internet 12 (S76).

The controller 51 of the printer 10 receives the acknowledgement transmitted by the information processing device 11 through the communication I/F 47 (S76). It is noted that, although not shown in the flowchart, the controller 51 performs a retry being a retransmission of the request until the controller 51 receives the response including the acknowledgement. The controller 51 ends the process in response to receiving the acknowledgement.

When the printer 10A is replaced with the printer 10B, the controller 51 of the printer 10B determines in step S71 that all the second CTG serial numbers do not match the first CTG serial numbers (S71: Yes). When it is determined that all the second CTG serial numbers do not match the first CTG serial numbers (S71: Yes), the controller 51 generates transmission data (S77). The transmission data includes a return instruction and cartridge identification information. The cartridge identification information is identification information generated by concatenating the first CTG serial numbers read from the IC memories 15 through the cartridge OF 49. That is, the cartridge identification information included in the transmission data is the cartridge identification information that is included in the transmission data and transmitted to the information processing device 11 by the controller 51 of the printer 10A, and registered in the backup database. The return instruction is an instruction for requesting to return the setting information registered in the backup database. The return instruction is, for example, a command accompanied by the cartridge identification information. The controller 51 of the printer 10B transmits the request including the generated transmission data to the information processing device 11 indicated by the transmission address stored in the EEPROM 57 through the communication I/F 47 and the Internet 12 (S78).

The controller 61 of the information processing device 11 receives the request transmitted by the printer 10 through the communication I/F 64 (S78). The controller 61 specifies a record having the same cartridge identification information as the cartridge identification information included in the received request in the backup database. Then, the controller 61 generates a response including the setting information "backup1.bin" included in the specified record. The controller 61 transmits the generated response as a reply to the received request through the communication I/F 64 and the Internet 12 (S79).

The controller 51 of the printer 10B receives the response transmitted by the information processing device 11 through the communication I/F 47 (S79). It is noted that, although not shown in the flowchart, the controller 51 performs a retry being a retransmission of the request until the controller 51 receives the response (S78). The controller 51 stores setting information included in the received response in the EEPROM 57 of the memory 53 (S54), and ends the process.

That is, the setting information of the printer 10A is taken over to the printer 10B. In the backup database, the cartridge identification information and the setting information of the record are not updated, and are managed as they are in the backup database as the record of the printer 10B.

When the ink is used up in all the cartridges 13 mounted in the mounting case 32 and all the cartridges 13 are replaced, the controller 51 determines that the printer 10 is replaced. In this case, the setting information set in the printer 10 is updated with the same setting information. However, since the setting information set in the printer 10 is updated with the same setting information and, as described above, the record managed by the backup database does not change, no trouble occurs in the printer 10 and the backup database. It is noted that it is rare that all the cartridges 13 are replaced.

[Effects of Variation]

Even when the CTG identification information assigned to the cartridge 13 is used in place of the device identification information assigned to the printer 10, the printer 10 can cause another printer to take over the setting information, and can take over the setting information of another printer. In addition, the printer 10 can reduce duty of an operator to input information for associating the printer 10A before replacement with the printer 10B after replacement to the information processing device 11.

The controller 51 of the printer 10 transmits a return instruction to the information processing device 11 in response to determining that all the CTG serial numbers read from the IC memories 15 do not match the CTG serial numbers stored in the EEPROM 57 (S78). Therefore, for example, in a case where one to three cartridges 13 are replaced, the return instruction is prevented from being erroneously transmitted to the information processing device 11.

[Other Variations]

In the above-described embodiment, an example in which the device identification information assigned to the printer 10 is registered in the backup database and stored in the IC memories 15 of the cartridges 13 has been described. That is, an example in which the setting information and the cartridges 13 are associated with each other through the device identification information of the printer 10 has been described. Additionally, in the above-described variation, an example in which the cartridge identification information generated from the CTG serial numbers assigned to the cartridges 13 is registered in the backup database and the setting information and the cartridges 13 are associated with each other through the CTG serial number has been described. However, other methods may be used as long as the setting information and the cartridges 13 can be associated with each other.

In the above-described embodiment, an example in which the service provider that provides the cartridge 13, which is a consumable item of the printer 10, to the user backs up the setting information of the printer 10 has been described. However, the service provider may provide only the backup service to the user.

In the above-described variation, an example in which the return instruction is transmitted to the information processing device 11 in response to determining that all the first CTG serial numbers read from the IC memories 15 do not match the second CTG serial numbers stored in the EEPROM 57 has been described. However, the return instruction may be transmitted to the information processing device 11 by another determination. For example, the return instruction may be transmitted to the information processing device 11 when the first CTG serial numbers do not match the second CTG serial numbers for two or three specific cartridges 13 such as the cyan cartridge 13 and the yellow cartridge 13.

Hereinabove, the illustrative embodiments according to aspects of the present disclosure have been described. The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that the present disclosure can be practiced without reapportioning to the details specifically set forth. In other instances, well known processing structures have not been described in detail, in order not to unnecessarily obscure the present disclosure.

Only exemplary illustrative embodiments of the present disclosure and but a few examples of their versatility are shown and described in the present disclosure. It is to be understood that the present disclosure is capable of use in various other combinations and environments and is capable of changes or modifications within the scope of the inventive concept as expressed herein.

The printer 10 in the above-described embodiment is an example of an image recording device according to aspects of the present disclosures. The printer 10A in the above-described embodiment is an example of first image recording device according to aspects of the present disclosures. The printer 10B in the above-described embodiment is an example of another image recording device according to aspects of the present disclosures. The touch sensor 44 and the operation switches 45 in the above-described embodiment are examples of an information interface according to aspects of the present disclosures. The mounting case 32 in the above-described embodiment is an example of a cartridge mount according to aspects of the present disclosures. The type information in the above-described embodiment is an example of permission information according to aspects of the present disclosures. The print engine 40 including at least the recorder 29 in the above-described embodiment is an example of a print engine according to aspects of the present disclosures. The communication I/F 47 in the above-described embodiment is an example of an information interface according to aspects of the present disclosures. The first update instruction in the above-described embodiment is an example of a device identification information update instruction according to aspects of the present disclosures. The CTG serial numbers and the cartridge identification information generated by concatenating the CTG serial numbers in the above-described embodiment are examples of cartridge identification information according to aspects of the present disclosures. The second update instruction in the above-described embodiment is an example of a cartridge identification information update instruction according to aspects of the present disclosures.

What is claimed is:

1. An image recording device comprising:
a cartridge mount to which a cartridge is to be mounted, a print engine that performs printing, a cartridge interface, an information interface, a memory, and a controller,
wherein the controller is configured to:
store setting information obtained through the information interface in the memory;
transmit identification information, the setting information, and a backup instruction to an information processing device through the information interface, the identification information being associated with the cartridge mounted in the cartridge mount, the backup instruction being for instructing to store the identification information and the setting information in association with each other;
obtain the identification information from a cartridge memory of the cartridge through the cartridge interface;
transmit the obtained identification information and a return instruction to the information processing device through the information interface, the return instruction being for instructing to return the setting information;
obtain the setting information from the information processing device through the information interface; and
store the setting information obtained from the information processing device in the memory.

2. The image recording device according to claim 1, wherein the identification information includes device identification information stored in advance in the memory,
wherein the controller is configured to:
determine whether or not the device identification information has been obtained from the cartridge memory through the cartridge interface; and
store the device identification information stored in the memory in the cartridge memory through the cartridge interface in response to determining that the device identification information has not been obtained from the cartridge memory.

3. The image recording device according to claim 2, wherein the controller is configured to transmit, to the information processing device through the information interface, first device identification information that is the device identification information obtained from the cartridge memory, second device identification information that is the device identification information stored in advance in the memory, the return instruction, and a device identification information update instruction instructing to update the first device identification information stored in the information processing device to the second device identification information.

4. The image recording device according to claim 2, wherein the cartridge mount is configured to hold a plurality of the cartridges, and
wherein the controller is configured to transmit the return instruction to the information processing device through the information interface in response to acquisition of the device identification information from the cartridge memories of all the cartridges mounted in the cartridge mount through the cartridge interface.

5. The image recording device according to claim 1, wherein the identification information includes cartridge identification information stored in advance in the cartridge memory,
wherein the controller is configured to:
compare the cartridge identification information obtained from the cartridge memory through the cartridge interface with the cartridge identification information stored in the memory; and
in response to determining that the cartridge identification information obtained from the cartridge memory is different from the cartridge identification information stored in the memory:
store the cartridge identification information obtained from the cartridge memory in the memory through the cartridge interface; and
transmit the cartridge identification information obtained from the cartridge memory and a cartridge identification information update instruction to the information processing device through the information interface, the cartridge identification information update instruction being for instructing to update the cartridge identification information stored in the information processing device with the transmitted cartridge identification information.

6. The image recording device according to claim 5,
wherein the cartridge mount is configured to hold a plurality of the cartridges, and
wherein the controller is configured to:
determine whether or not the cartridge identification information obtained from the cartridge memory of the cartridge mounted in the cartridge mount through the cartridge interface matches the cartridge identification information stored in the memory for all the cartridges mounted in the cartridge mount; and
transmit the return instruction to the information processing device through the information interface in response to determining that all pieces of the cartridge identification information read from the cartridge memories do not match pieces of the cartridge identification information stored in the memory.

7. The image recording device according to claim 1,
wherein the controller is configured to:
determine whether or not permission information has been obtained from the cartridge memory through the cartridge interface; and
transmit the identification information and a deletion instruction instructing to delete the setting information associated with the identification information to the information processing device though the information interface in response to determining that the permission information has not been obtained.

8. A backup method executed by a first image recording device and a second image recording device each comprising a cartridge mount to which a cartridge is to be mounted, a printing part that performs printing, a cartridge interface, an information interface, a memory, and a controller,
wherein the controller of the first image recording device is configured to store setting information obtained through the information interface in the memory and transmits identification information, the setting information and a backup instruction to an information processing device through the information interface, the identification information being associated with the cartridge mounted in the cartridge mount, and the backup instruction being for instructing to store the identification information and the setting information in association with each other; and
wherein the controller of the second image recording device is configured to:
obtain, through the cartridge interface, the identification information from a cartridge memory of the cartridge detached from the first image recording device and mounted to the cartridge mount of the second image recording device and transmits, to the information processing device through the information interface, the obtained identification information and a return instruction instructing to return the setting information; and
obtain the setting information from the information processing device through the information interface and stores the obtained setting information in the memory.

9. A non-transitory computer-readable medium storing computer-readable instructions configured to, when executed by a controller of an image recording device having a cartridge mount to which a cartridge is to be mounted, a printing part that performs printing, a cartridge interface, an information interface, and a memory, cause the controller to:
store setting information obtained through the information interface in the memory;
transmit identification information, the setting information and a backup instruction to an information processing device through the information interface, the identification information being associated with the cartridge mounted in the cartridge mount, and the backup instruction being for instructing to store the identification information and the setting information in association with each other;
obtain the identification information from a cartridge memory of the cartridge through the cartridge interface;
transmit the obtained identification information and a return instruction to the information processing device through the information interface, the return instruction being for instructing to return the setting information;
obtain the setting information from the information processing device through the information interface; and
store the setting information obtained from the information processing device in the memory.

* * * * *